United States Patent
Savo

(10) Patent No.: US 7,198,322 B2
(45) Date of Patent: Apr. 3, 2007

(54) SPOILER AND METHOD OF USING THE SAME

(76) Inventor: Marco Savo, 13 Oak Ridge Rd., Newton, CT (US) 06470

( * ) Notice: Subject to any disclaimer, the term of this patent is extended or adjusted under 35 U.S.C. 154(b) by 0 days.

(21) Appl. No.: 11/110,266

(22) Filed: Apr. 20, 2005

(65) Prior Publication Data
US 2006/0237991 A1  Oct. 26, 2006

(51) Int. Cl.
*B60J 9/04* (2006.01)

(52) U.S. Cl. .................................... 296/180.5

(58) Field of Classification Search ............. 296/180.5, 296/180.1, 180.2, 180.3, 180.4, 181.5; 180/903; 280/847, 850, 851, 853
See application file for complete search history.

(56) References Cited

U.S. PATENT DOCUMENTS

| | | | | |
|---|---|---|---|---|
| 3,215,377 A | * | 11/1965 | Jarecki | 244/134 R |
| 3,596,974 A | * | 8/1971 | Adams | 296/180.2 |
| 4,379,582 A | * | 4/1983 | Miwa | 296/180.5 |
| 4,611,796 A | * | 9/1986 | Orr | 296/180.2 |
| 4,693,506 A | * | 9/1987 | Massengill | 296/180.3 |
| 4,824,165 A | * | 4/1989 | Fry | 296/180.3 |
| 4,951,994 A | * | 8/1990 | Miwa | 296/180.1 |
| 5,054,844 A | * | 10/1991 | Miwa | 296/198 |
| 5,092,648 A | * | 3/1992 | Spears | 296/180.3 |
| 5,429,411 A | * | 7/1995 | Spears | 296/180.1 |
| 5,522,637 A | * | 6/1996 | Spears | 296/180.3 |
| 5,536,062 A | * | 7/1996 | Spears | 296/180.3 |
| 5,538,316 A | * | 7/1996 | Bartholomew | 296/180.5 |
| 5,653,493 A | * | 8/1997 | Spears | 296/180.2 |
| 5,876,088 A | * | 3/1999 | Spears | 296/180.5 |
| 6,099,069 A | * | 8/2000 | Spears | 296/180.2 |
| 6,170,596 B1 | * | 1/2001 | Triarsi et al. | 180/291 |
| 6,540,282 B2 | * | 4/2003 | Pettey | 296/180.5 |
| 6,926,346 B1 | * | 8/2005 | Wong et al. | 296/180.5 |
| 2003/0230677 A1 | * | 12/2003 | Milliere | 244/213 |

FOREIGN PATENT DOCUMENTS

| | | | | |
|---|---|---|---|---|
| EP | 000366616 | * | 5/1990 | 296/180.2 |
| JP | 362218287 | * | 9/1987 | 296/180.1 |
| JP | 362221977 | * | 9/1987 | 296/180.1 |
| JP | 362221978 | * | 9/1987 | 296/180.1 |
| JP | 411091642 | * | 4/1999 | |

* cited by examiner

*Primary Examiner*—H Gutman

(57) ABSTRACT

A spoiler, comprising a body, the body operable for being connected to a vehicle, an aperture defined by the body, an air flow control member pivotally connected to the body, the air flow control member operable to one of open and close the aperture, and a releasable lock operable for securing the air flow control member one of in a fully open position and in a closed position, a plurality of intermediate positions exist between the fully open position and the closed position, and the releasable lock is operable for securing the member in any of the plurality of intermediate positions.

16 Claims, 8 Drawing Sheets

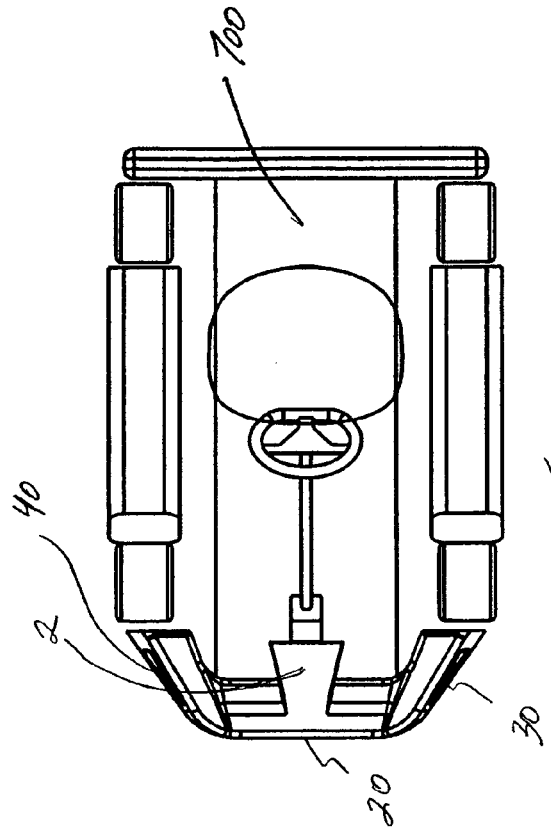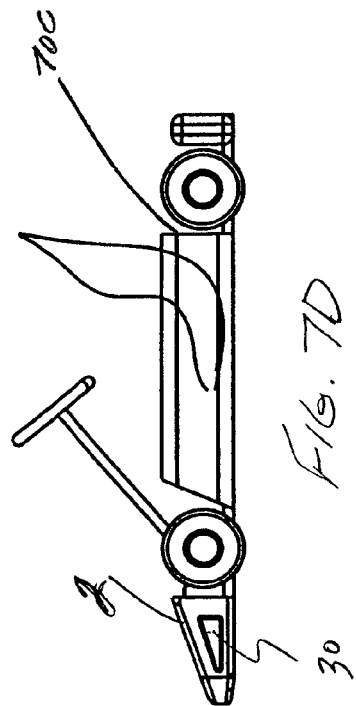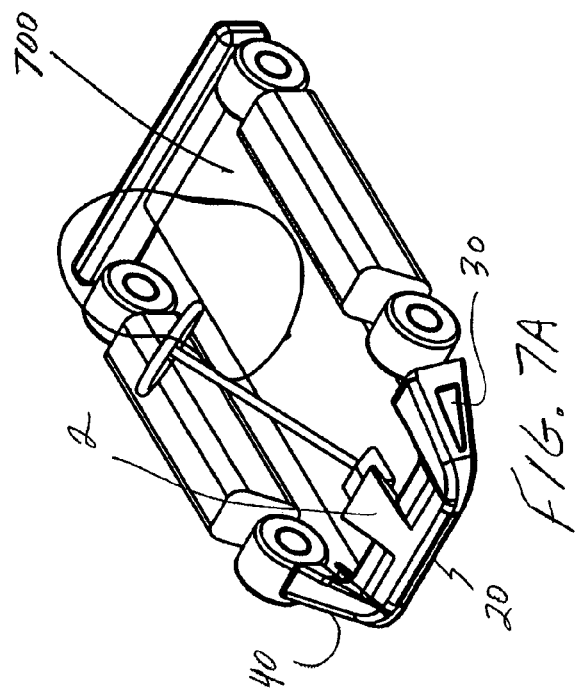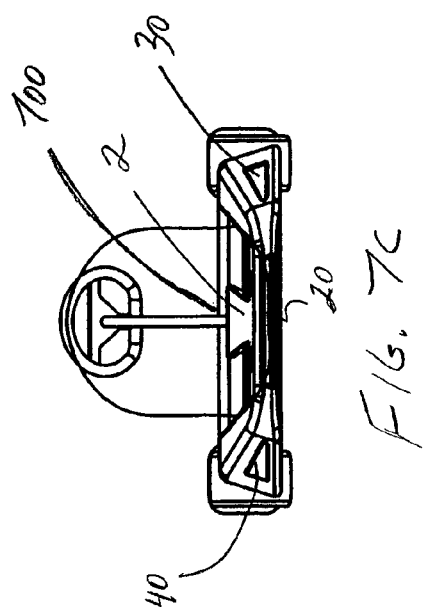

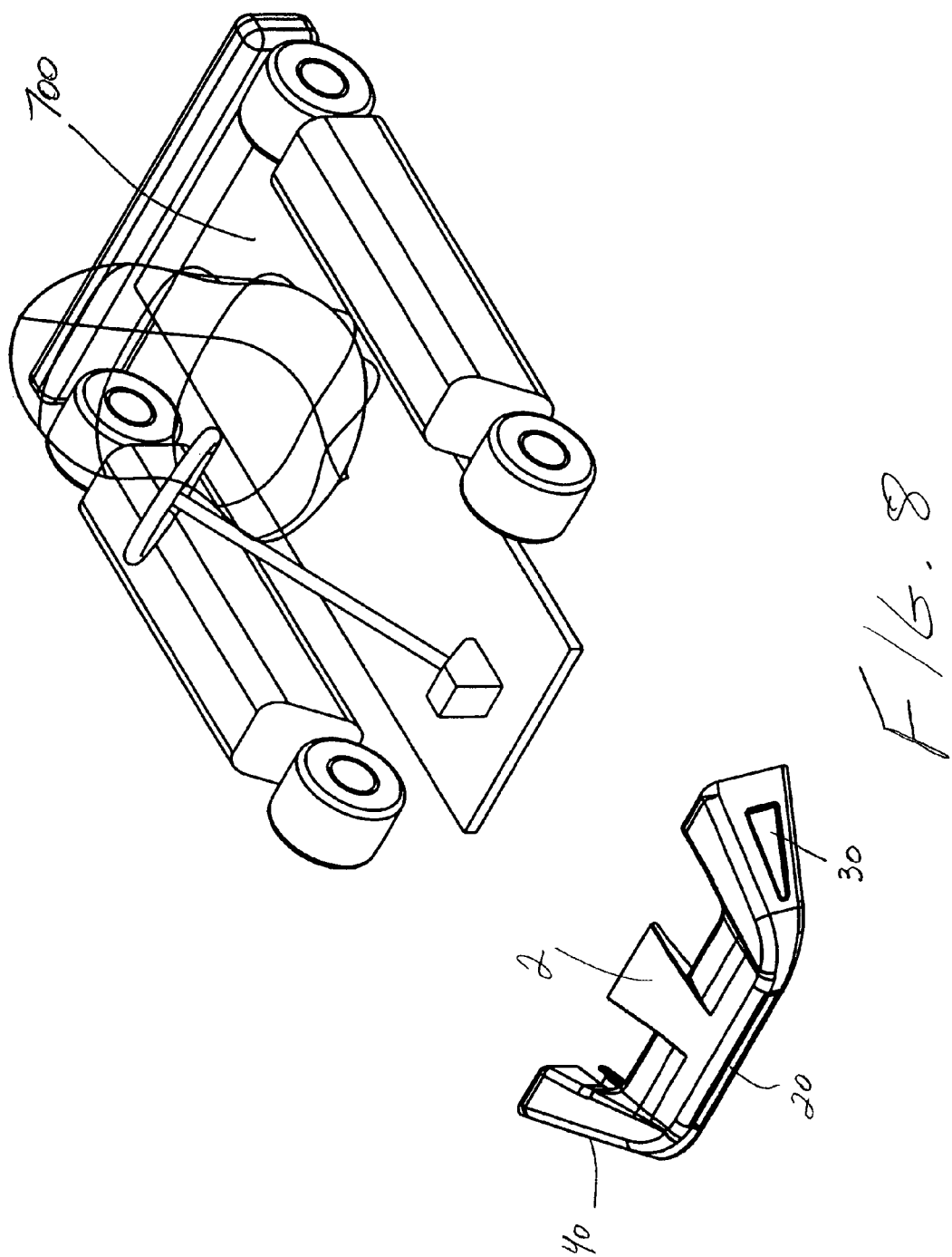

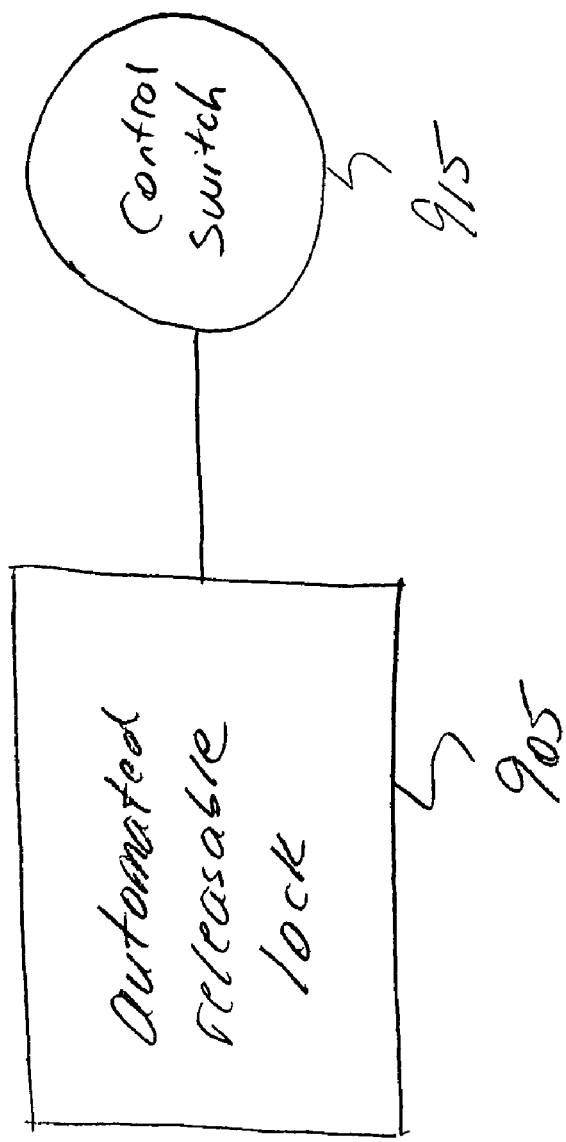

SPOILER AND METHOD OF USING THE SAME

CROSS-REFERENCE TO RELATED APPLICATIONS

This application claims the benefit of Italian patent application no FR2004A000019, filed Nov. 10, 2004.

FIELD

The present application generally relates to spoilers and, more particularly, relates to a spoiler having at least one aperture.

BACKGROUND

Traditionally, spoilers have been used on motor vehicles. Such spoilers are often mounted under a front bumper of the motor vehicle and/or mounted on a trunk of the motor vehicle, the spoilers being either factory installed by the manufacturer of the motor vehicle or installed after market by a third party. These spoilers can be an aerodynamically shaped device mounted on the vehicle for appearance and to enhance air flow over, under and around the vehicle when the vehicle is in motion. Spoilers are manufactured in many shapes and sizes and are designed to be mounted on various kinds of motor vehicles, including cars, trucks and go-carts. Known spoilers, such as go-cart spoilers, however, are passive devices in that an operator does not have any control over the manner in which air flow interacts with the spoiler when the motor vehicle is moving.

Therefore, a need exist for a spoiler that can be repeatedly adjusted by an operator as desired for controlling the air flow interaction with the spoiler.

SUMMARY

An aspect of the present application provides for a spoiler, comprising a body, the body operable for being connected to a vehicle, an aperture defined by the body, and an air flow control member pivotally connected to the body, the air flow control member operable to one of open and close the aperture.

Another aspect of the present application provides for a spoiler, comprising a body, the body operable for being connected to a vehicle, a plurality of apertures defined by the body, a plurality of air flow control members pivotally connected to the body by a plurality of respective hinges, and a plurality of releasable locks operable for securing the plurality of respective air flow control members one of in an open position and in a closed position, wherein the open position allows airflow through the plurality of apertures, and the closed position prevents airflow through the plurality of apertures.

A further aspect of the present application provides for a method for using a spoiler, the method comprising loosening a fastener securing an air flow control member in a first position, the air flow control member being connected to the spoiler and being located behind an aperture of the spoiler, moving the air flow control member to a second position and securing the fastener so the air flow control member remains stationary in the second position.

A still further aspect of the present application provides for a vehicle spoiler, comprising a body with left and right end sections connected by a traverse middle section, the left and right end sections forming respectively left and right corner bumpers, and the middle section forming a front bumper of the spoiler, each of the corner bumpers defining a side aperture therethrough and including a flap pivotally mounted behind the aperture to selectively open and close the aperture, and releasable locking means to secure said flap in a desired position relative to the aperture to control air flow therethrough, and the front bumper defining a front aperture therethrough and including a flap pivotally mounted behind the front aperture to selectively open and close the front aperture, and releasable locking means to secure the flap in a desired position relative to the aperture to control air flow therethrough.

DESCRIPTION OF DRAWINGS

FIG. 7A illustrates the exemplary spoiler depicted in FIGS. 1–5 connected to a vehicle;

FIG. 7B illustrates a top view of the exemplary spoiler depicted in FIGS. 1–5 connected to a vehicle;

FIG. 7C illustrates a front view of the exemplary spoiler depicted in FIGS. 1–5 connected to a vehicle;

FIG. 7D illustrates a side view of the exemplary spoiler depicted in FIGS. 1–5 connected to a vehicle;

FIG. 8 illustrates the exemplary spoiler depicted in FIGS. 1–5 removably connected to a vehicle; and FIG. 9 illustrates a releasable lock of the exemplary spoiler depicted in FIG. 1 being electronically operated.

DETAILED DESCRIPTION

The present application relates to a spoiler. The exemplary spoilers described and illustrated in the present application are constructed to be mounted on the front of a vehicle. The exemplary embodiments of the present application, however, are not meant to be limited to a spoiler constructed to be mounted on the front of a vehicle. Rather, the spoiler can be located anywhere on the vehicle such that air flow interacts with the spoiler when the vehicle is in motion. Hence, the spoiler is not limited to any specific size or shape, as the location of the spoiler and the type of vehicle may determine such functional characteristics of the spoiler. Further, the spoiler can be mounted, either permanently or removably (see FIG. 8), to any type of vehicle, including cars, trucks, go-carts, ATVs, snow mobiles, boats, planes, trains, sleds or the like. The vehicle may or may not be powered by a motor.

Figure 1:
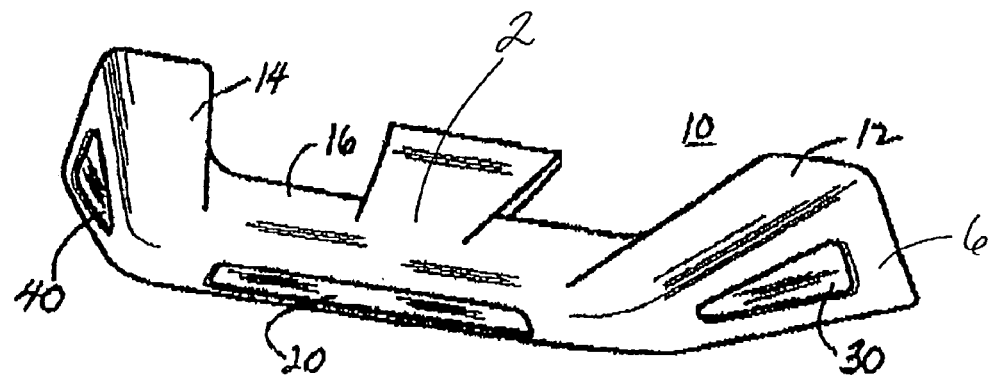
FIG. 1 illustrates a front view of an exemplary spoiler according to the exemplary embodiments of the present application.
Figure 2:
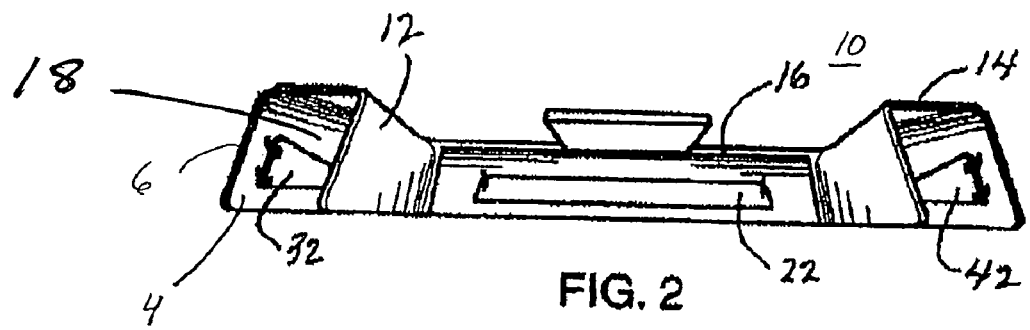
FIG. 2 illustrates a rear view of the exemplary spoiler depicted in FIG. 1.
Figure 3:
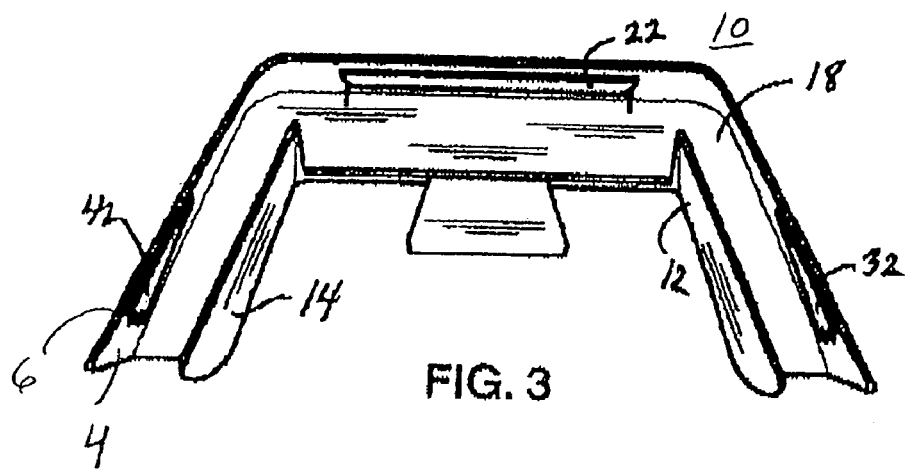
FIG. 3 illustrates a bottom view of the exemplary spoiler depicted in FIG. 1.

FIGS. 1–5 illustrate exemplary spoiler 10. As can be seen in FIG. 1, spoiler 10 includes spoiler body 2 having inner wall 4 and outer wall 6. Spoiler body 2 can be constructed as a one-piece molded body with left and right end sections 12, 14 connected by transverse middle section 16. Alternatively, spoiler body 2 can be constructed of a plurality of separate sections affixed together. For instance, left end section 12 and right end section 14 can be connected, either permanently or removably, to middle section 16. If the plurality of separate sections are removably connected, any of the plurality of sections can be replaced, for instance, with another section having the same aperture, a different aperture, or a different amount of apertures. Left and right end sections 12, 14, can be, respectively, left and right corner bumpers and middle section 16 can be the front bumper of spoiler 10. As will be appreciated by a person having ordinary skill in the art, spoiler 10 does not have to be operable as a bumper for protecting a vehicle and/or its operator in the event of impact. Rather, spoiler 10 can be used in conjunction with such a bumper. As can be seen in FIGS. 2 and 3, spoiler body 2 can be constructed to form inverted channel 18, for instance, to facilitate the mounting of spoiler 10 on the front end of a vehicle.

Figure 4A:
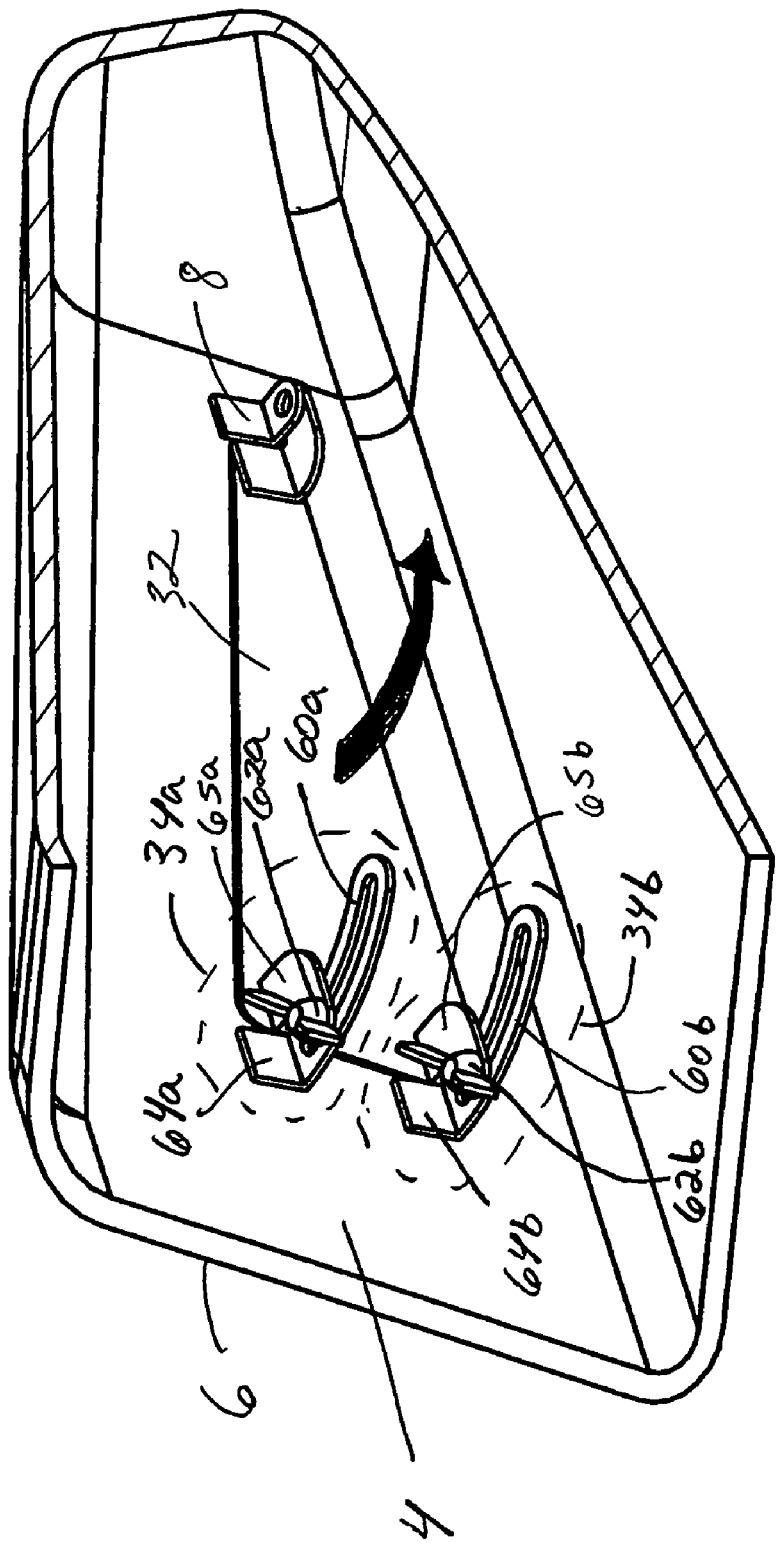
FIG. 4A illustrates a side portion of the exemplary spoiler depicted in FIG. 2.

As shown in FIG. 1, left end section 12 includes at least one side aperture 30 and at least one air flow control member 32. As will also be appreciated by a person having ordinary skill in the art, side aperture 30 is not limited to any specific size, shape, or location in left end section 12. Air flow control member 32 is pivotally connected to inner wall 4 of spoiler body 2 by hinge 8, as depicted in FIG. 4a. More particularly, air flow control member 32 is mounted such that air flow control member 32 is located behind side aperture 30, as shown in FIGS. 2, 3 and 4a. Hinged air flow control member 32 is operable to open and close side aperture 30 as desired by an operator. Air flow control member 32 can be, for example, a flat or substantially flat flap or a flap having curvature depending on the shape and size of aperture 30. Further, air flow control member 32, like spoiler body 2, can be constructed of various types of material, for instance, plastic, fiberglass or metal.

Figure 4B:
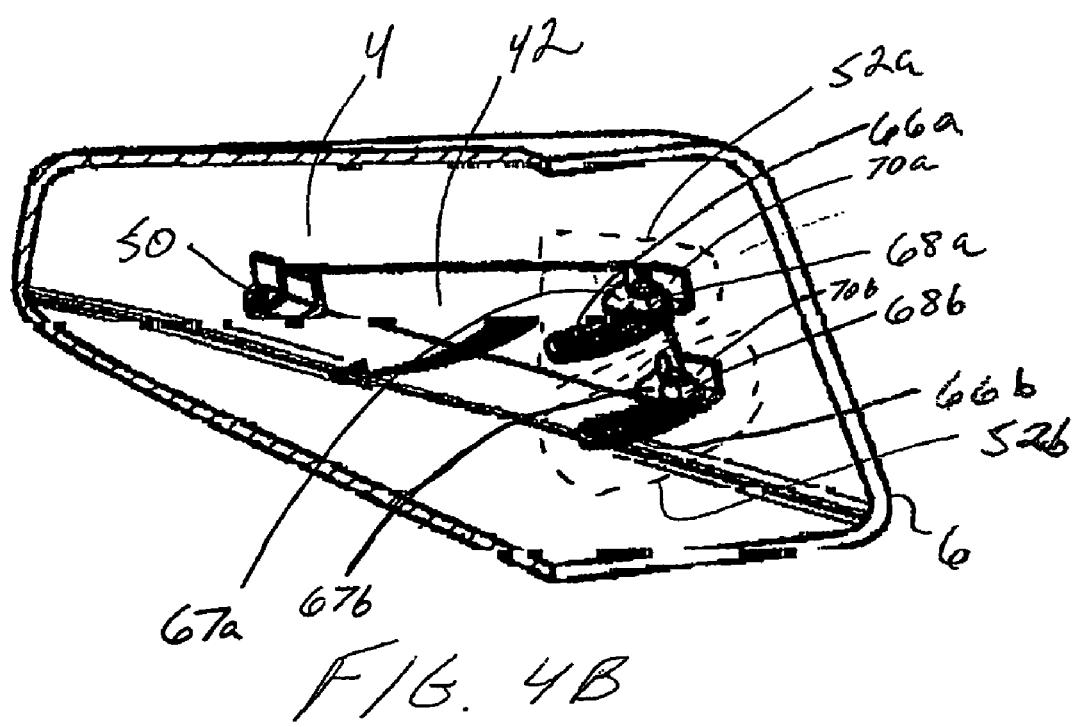
FIG. 4B illustrates another side portion of the exemplary spoiler depicted in FIG. 2.

Similarly, right end section 14 includes at least one side aperture 40 and at least one air flow control member 42. As can be seen in FIGS. 4a and 4b, in an exemplary embodiment, the components of right end section 14 and left end section 12 are substantially the same. Like side aperture 30, side aperture 40 is also not limited to any specific size, shape or location in right end section 14. Air flow control member 42 is pivotally connected to inner wall 4 of spoiler body 2 by hinge 50, as depicted in FIG. 4b. More particularly, air flow control member 42 is mounted such that air flow control member 42 is located behind side aperture 40, as shown in FIGS. 2, 3 and 4b. Hinged air flow control member 42 is operable to open and close side aperture 40 as desired by an operator. Air flow control member 42 can be, for example, a flat or substantially flat flap or a flap having curvature depending on the shape and size of aperture 30. Additionally, air flow control member 42, like spoiler body 2, can be constructed of various types of material, for instance, plastic, fiberglass or metal.

FIG. 4a shows air flow control member 32 and its operation in more detail. As can be seen in FIG. 4a, air flow control member 32 is mounted on inner wall 4 of body 2 by hinge 8 so that air flow control member 32 is located behind left aperture 30. Air flow control member 32 is hinged for pivotal operation, as indicated by the arrow, to open and close aperture 30. Releasable locks 34a, 34b are also mounted on inner wall 4 of body 2 and are connected to air flow control member 32 by air flow control member brackets 65a, 65b. Releasable locks 34a, 34b are operable for retaining aperture 30 in a fully open position, a closed position or in any intermediate position and thereby controlling air flow through left aperture 30. Alternatively, more or less releasable locks can be used for controlling the position of air flow control member 32. In an even further alternative embodiment, one or more separate releasable locks are not utilized. Rather, a releasable lock is integrated into hinge 8 or hinge 8 is also operable as a releasable lock.

FIG. 4b illustrates air flow control member 42 and its operation in more detail. Air flow control member 42 is mounted on inner wall 4 of body 2 by hinge 50 so that air flow control member 42 is located behind right aperture 40. Air flow control member 42 is hinged for pivotal operation, as indicated by the arrow, to open and close aperture 40. Releasable locks 52a, 52b are also mounted on inner wall 4 of body 2 and are connected to air flow control member 42 by air flow control member brackets 67a, 67b. Releasable locks 52a, 52b are operable for retaining aperture 40 in a fully open position, a closed position or in any intermediate position and thereby controlling air flow through right aperture 40. Alternatively, more or less releasable locks can be used for controlling the position of air flow control member 42. In an even further alternative embodiment, one or more separate releasable locks are not utilized. Rather, a releasable lock is integrated into hinge 50 or hinge 50 is also operable as a releasable lock.

Figure 5:
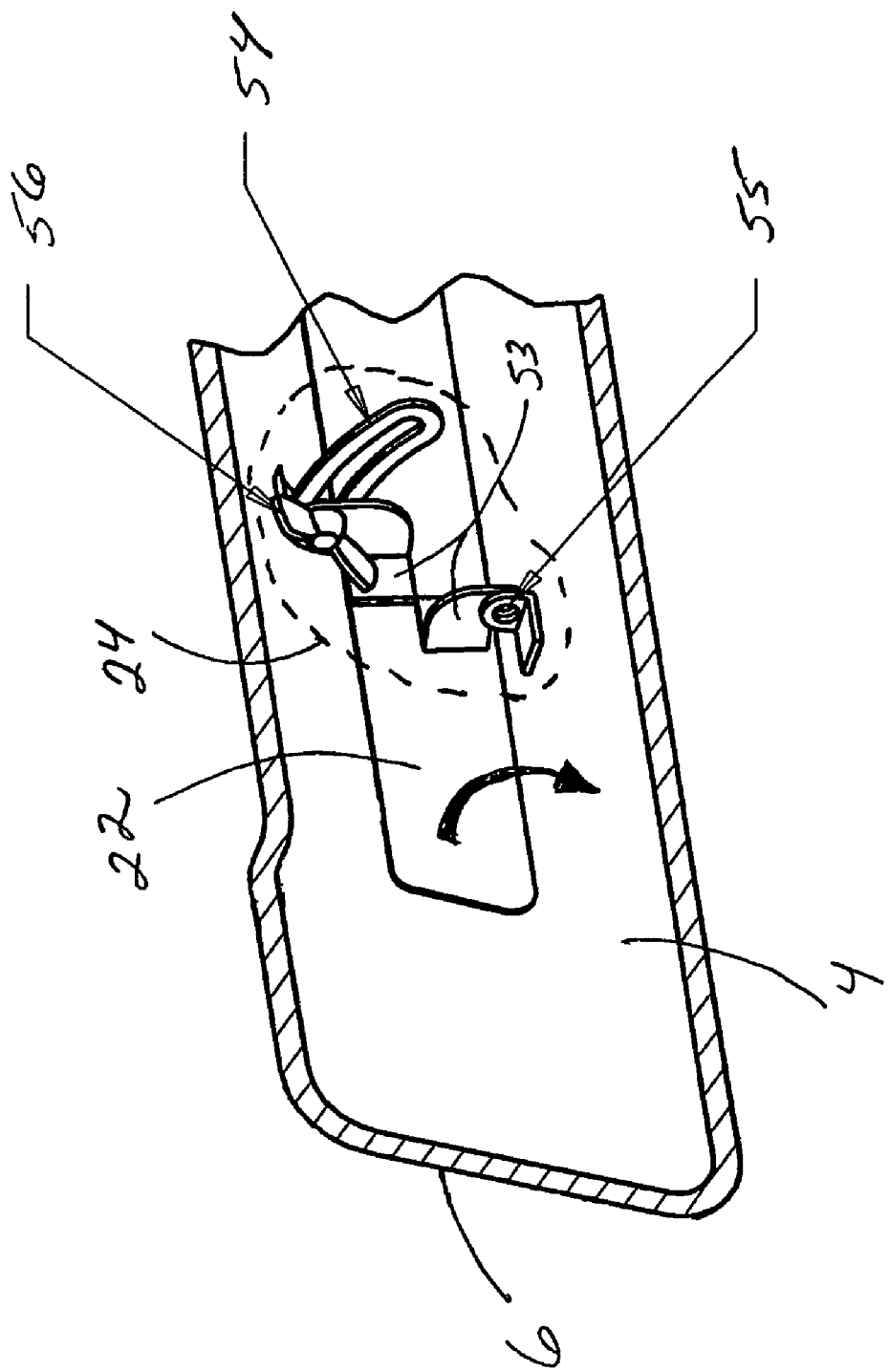
FIG. 5 illustrates another portion of the exemplary spoiler depicted in FIG. 2.

In an exemplary embodiment, middle section 16 of body 2 also includes at least one aperture. FIG. 1 depicts aperture 20 located in middle section 16. Aperture 20 is also not limited to any specific size, shape or location in middle section 16. Air flow control member 22 is pivotally connected to inner wall 4 of spoiler body 2 by hinge 55, as shown in FIG. 5. More particularly, air flow control member 22 is mounted such that air flow control member 22 is located behind aperture 20, as shown in FIGS. 2, 3 and 5. Hinged air flow control member 22 is operable to open and close aperture 20 as desired by an operator. Air flow control member 22 can be, for example, a flat or substantially flat flap or a flap having curvature depending on the shape and size of aperture 20. Further, air flow control member 22, like spoiler body 2, can be constructed of various types of material, for instance, plastic, fiberglass or metal.

FIG. 5 shows air flow control member 22 and its operation in more detail. As can be seen in FIG. 5, air flow control member 22 is mounted on inner wall 4 of body 2 by hinge 55 so that air flow control member 22 is located behind aperture 20. Additional hinges can be used for mounting air flow control member 22 to inner wall 4. Air flow control member 22 is hinged for pivotal operation, as indicated by the arrow, to open and close aperture 20. Releasable lock 24 is also mounted on inner wall 4 of body 2 and is connected to air flow control member 22 by bracket 53. Releasable lock 24 is operable for retaining aperture 20 in a fully open position, a closed position or in any intermediate position and thereby controlling air flow through aperture 20. Alternatively, multiple releasable locks can be used for controlling the position of air flow control member 22. In an even further alternative embodiment, one or more separate releasable locks are not utilized. Rather, a releasable lock is integrated into hinge 55 or hinge 55 is also operable as a releasable lock.

Exemplary components of releasable locks 24, 34a, 34b, 52a, 52b are shown in FIGS. 4a, 4b and 5. Releasable locks 24, 34a, 34b, 52a, 52b include a position control member, a fastener and a hinge. Specifically, releasable lock 24 includes position control member 54, fastener 56 and hinge 55, releasable locks 34a, 34b include position control members 60a, 60b, fasteners 62a, 62b and brackets 64a, 64b, respectively, and releasable locks 52*a*, 52*b* include position control members 66*a*, 66*b*, fasteners 68*a*, 68*b* and brackets 70*a*, 70*b*, respectively. As can be seen in FIGS. 4*a*, 4*b* and 5, the respective position control members and the respective hinges or brackets are connected to spoiler body 2. Additionally, air flow control member bracket 53 connects air flow control member 22 to releasable lock 24, air flow control member brackets 65*a*, 65*b* connect air flow control member 32 to releasable locks 34*a*, 34*b*, respectively, and air flow control member brackets 67*a*, 67*b* connect air flow control member 42 to releasable locks 52*a*, 52*b*, respectively. As a result, position control members 54, 60*a*, 60*b*, 66*a*, 66*b* control the range of movement of the respective air flow control member.

FIGS. 4*a*, 4*b* and 5 illustrate exemplary fasteners 62*a*, 62*b*, fasteners 68*a*, 68*b* and fastener 56, respectively. Fasteners 62*a*, 62*b*, fasteners 68*a*, 68*b* and fastener 56 include a bolt or the like and a nut or the like fastened to the bolt for securing the respective air flow control member in a specific position, that is, in a fully open position, a closed position or in any an intermediate position. As shown in FIG. 4*a*, the bolts pass through position control members 60*a*, 60*b* and air flow control member brackets, as shown in FIG. 4*b*, the bolts pass through position control members 66*a*, 66*b* and air flow control member brackets, and as shown in FIG. 5, the bolt passes through position control member 54 and air flow control member brackets. The range of movement of the bolts is controlled because each bolt is movable within a cutout portion of the corresponding position control member, as can be seen in FIGS. 4*a*, 4*b* and 5.

As will be appreciated by a person having ordinary skill in the art, the exemplary embodiments are not limited to releasable locks 24, 34*a*, 34*b*, 52*a*, 52*b* and their corresponding components describes and illustrated in the present application. Rather, any manual mechanism can be used that provides an operator the ability to vary the position of an air flow control member as desired, whereby the air flow control member will remain stationary until the position is again changed by the operator. Such releasable locks may or may not limit an operator to a particular range of movement. Alternatively, releasable locks 24, 34*a*, 34*b*, 52*a*, 52*b* can be automated, for instance, electronically driven and remotely controlled by an operator. Automated releasable locks 905 can be hard-wired to a control switch 910 available to an operator within or outside a vehicle or wirelessly controlled, as shown in FIG. 9. The control switch can also provide the operator a plurality of choices for opening or closing any one of air flow control members a desired amount. Moreover, releasable locks 24, 34*a*, 34*b*, 52*a*, 52*b* can be manually operable and electronically operable giving an operator a choice as to manner in which to control the respective air flow control members.

Spoiler 10 enables an operator to set the position of at least one air flow control member, for example, at least one of air flow control members 22, 32, 42, either manually or electronically, to achieve a desired pattern of air flow during vehicle operation. In order for an operator to reposition air flow control members 22, 32, 42, assuming exemplary releasable locks 24, 34*a*, 34*b*, 52*a*, 52*b* are utilized, the operator gains access to the respective releasable lock, for instance, by temporarily removing the spoiler from the vehicle to gain access to the respective releasable lock or reaching into the space housing the respective releasable lock without removing the spoiler. The operator can loosen the respective fastener(s), move the respective fastener(s) to a desired position, and retighten the respective fastener(s). As will be appreciated by a person having ordinary skill in the art, the manner of changing the position of an air flow control member will depend on the construction of the releasable lock and whether the releasable lock can be manually adjusted and/or electronically adjusted. By changing the pattern of air flow, aerodynamics, stability or speed of the vehicle, for instance, are changed.

Figure 6A:
FIG. 6A illustrates a further exemplary spoiler according to the exemplary embodiments of the present application.
Figure 6B:
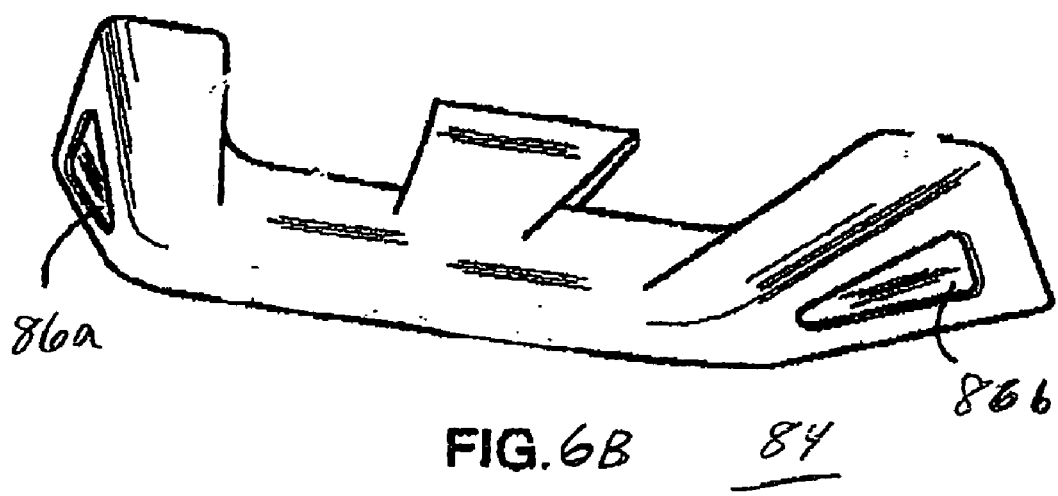
FIG. 6B illustrates a still further exemplary spoiler according to the exemplary embodiments of the present application.

FIGS. 6*a* and 6*b* illustrate further exemplary spoilers. FIG. 6*a* depicts a front view of spoiler 80 including aperture 82 and FIG. 6*b* depicts a front view of spoiler 84 including apertures 86*a*, 86*b*. Spoilers 10, 80 and 84 are merely illustrative and not meant to limit the present application to a spoiler having a particular quantity of apertures and apertures positioned in any particular portion of the spoiler. Additionally, the apertures and their corresponding air flow control members can be any size or shape.

The exemplary spoilers described and illustrated in the present application are operable for being mounted on the front of a vehicle 700, for example, as shown in FIGS. 7A–7D. The exemplary embodiments, however, are equally applicable to a spoiler operable for being mounted on the rear of a vehicle, along the side of a vehicle or anywhere along a top or a bottom of a vehicle. Accordingly, such spoilers can assume any size or shape which may depend on the type of vehicle and mounting location on the vehicle.

What is claimed is:

1. A spoiler, comprising:
   a go-cart body;
   an aperture defined by the go-cart body; and
   an air flow control member pivotally connected to the go-cart body, the air flow control member operable to one of cover and uncover the aperture.

2. The spoiler as set forth in claim 1, wherein the go-cart body is removably connected to a go-cart.

3. A spoiler, comprising:
   a body, the body operable for being connected to a go-cart;
   an aperture defined by the body; and
   an air flow control member pivotally connected to the body, the air flow control member operable to one of cover and uncover the aperture, wherein
   the aperture is a first aperture and further comprising:
   a second aperture defined by the body; and
   a second air flow control member pivotally connected to the body, the second air flow control member operable to one of cover and uncover the second aperture.

4. The spoiler as set forth in claim 3, further comprising:
   a third aperture defined by the body; and
   a third air flow control member pivotally connected to the body, the third air flow control member operable to one of cover and uncover the third aperture.

5. The spoiler as set forth in claim 1, wherein the member is pivotally connected to the body by a hinge.

6. A spoiler, comprising:
   a body, the body operable for being connected to a go-cart;
   an aperture defined by the body; and
   an air flow control member pivotally connected to the body, the air flow control member operable to one of cover and uncover the aperture, wherein
   the member is pivotally connected to the body by a hinge, and
   the hinge is operable as a releasable lock.

7. A spoiler, comprising:
   a body, the body operable for being connected to a go-cart:
   an aperture defined by the body;

an air flow control member pivotally connected to the body, the air flow control member operable to one of cover and uncover the aperture; and
a releasable lock operable for securing the air flow control member one of in a fully open position and in a closed position.

8. The spoiler as set forth in claim 7, wherein
a plurality of intermediate positions exist between the fully open position and the closed position, and
the releasable lock is operable for securing the member in any of the plurality of intermediate positions.

9. The spoiler as set forth in claim 7, wherein
the releasable lock is manually operated.

10. The spoiler as set forth in claim 7, wherein
the releasable lock is electronically operated.

11. A spoiler, comprising:
a body, the body operable for being connected to a go-cart;
a plurality of apertures defined by the body;
a plurality of air flow control members pivotally connected to the body by a plurality of respective hinges; and
a plurality of releasable locks operable for securing the plurality of respective air flow control members in one of an open position and a closed position, wherein
the open position allows airflow through the plurality of apertures, and
the closed position prevents airflow through the plurality of apertures.

12. A method for using a spoiler, the method comprising:
loosening a fastener securing an air flow control member in a first position, the air flow control member being connected to the spoiler and being located behind an aperture of the spoiler;
moving the air flow control member to a second position; and
securing the fastener so the air flow control member remains stationary in the second position.

13. The method as set forth in claim 12, wherein
loosening the fastener includes
manually loosening the fastener.

14. The method as set forth in claim 12, wherein
moving the air flow control member includes
manually moving the air flow control member.

15. The method as set forth in claim 12, wherein
securing the fastener includes
manually securing the fastener.

16. A vehicle spoiler, comprising:
a body with left and right end sections connected by a traverse middle section, the left and right end sections forming respectively left and right corner bumpers, and the middle section forming a front bumper of the spoiler;
each of the corner bumpers defining a side aperture therethrough and including a side flap pivotally mounted behind the side aperture to selectively cover and uncover the side aperture, and side releasable locking means to secure the side flap in a desired position relative to the side aperture to control air flow therethrough; and
the front bumper defining a front aperture therethrough and including a front flap pivotally mounted behind the front aperture to selectively cover and uncover the front aperture, and front releasable locking means to secure the front flap in a desired position relative to the front aperture to control air flow therethrough.

\* \* \* \* \*